(12) United States Patent
Yan

(10) Patent No.: US 11,824,779 B2
(45) Date of Patent: Nov. 21, 2023

(54) TRAFFIC FORWARDING PROCESSING METHOD AND DEVICE

(71) Applicant: Huawei Technologies Co., Ltd., Shenzhen (CN)

(72) Inventor: Zhaoyang Yan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/174,253

(22) Filed: Feb. 24, 2023

(65) Prior Publication Data

US 2023/0208759 A1 Jun. 29, 2023

Related U.S. Application Data

(63) Continuation of application No. PCT/CN2021/114303, filed on Aug. 24, 2021.

(30) Foreign Application Priority Data

Aug. 28, 2020 (CN) .......................... 202010890103.5

(51) Int. Cl.
*H04L 45/74* (2022.01)
*H04L 45/02* (2022.01)
*H04L 45/00* (2022.01)

(52) U.S. Cl.
CPC .............. *H04L 45/74* (2013.01); *H04L 45/02* (2013.01); *H04L 45/566* (2013.01)

(58) Field of Classification Search
CPC ....... H04L 45/74; H04L 45/02; H04L 45/566; H04L 45/243; H04L 45/66; H04L 47/10; H04L 47/125; H04L 45/00; H04L 49/70; H04L 45/54
See application file for complete search history.

(56) References Cited

U.S. PATENT DOCUMENTS

| | | | |
|---|---|---|---|
| 2016/0378606 A1* | 12/2016 | Sajassi | H04L 45/22 |
| | | | 714/4.2 |
| 2020/0084143 A1* | 3/2020 | Gandhi | H04L 45/24 |
| 2021/0083933 A1* | 3/2021 | Bull | H04L 47/22 |
| 2021/0273827 A1* | 9/2021 | Vairavakkalai | H04L 45/745 |
| 2021/0352011 A1* | 11/2021 | Boutros | H04L 12/44 |
| 2021/0385150 A1* | 12/2021 | Shrivastava | H04L 45/02 |

FOREIGN PATENT DOCUMENTS

WO WO-2021036334 A1 * 3/2021 ............. H04L 45/02

* cited by examiner

*Primary Examiner* — Austin J Moreau
(74) *Attorney, Agent, or Firm* — Slater Matsil, LLP

(57) ABSTRACT

Embodiments of this application disclose a traffic forwarding processing method and a device. The method includes: A first network device receives a first packet that is from a second network device and that includes a MAC address of a destination device and a color identifier of the MAC address. The first network device obtains an address of a third network device, where the destination device is multi-homed to the second network device and the third network device. The first network device determines a first forwarding policy based on the address of the third network device and the color identifier, and forwards, to the third network device according to the first forwarding policy, traffic destined for the MAC address.

20 Claims, 8 Drawing Sheets

S501: A first network device receives a first packet from a second network device, where the first packet includes an address of the second network device, a MAC address of a destination device, and a configured color identifier of the MAC address, and the first packet further includes an address of a third network device or further includes an identifier indicating the address of the third network device

↓

S502: The first network device obtains the address of the third network device

↓

S503: The first network device determines a first forwarding policy based on the address of the third network device and the color identifier, and forwards, to the third network device according to the first forwarding policy, traffic destined for the MAC address

TRAFFIC FORWARDING PROCESSING METHOD AND DEVICE

CROSS-REFERENCE TO RELATED APPLICATIONS

This application is a continuation of International Application No. PCT/CN2021/114303, filed on Aug. 24, 2021, which claims priority to Chinese Patent Application No. 202010890103.5, filed on Aug. 28, 2020. The disclosures of the aforementioned applications are hereby incorporated by reference in their entireties.

TECHNICAL FIELD

The present disclosure relates to the field of communication technologies, and in particular, to a traffic forwarding processing method and a device.

BACKGROUND

In a network based on a traffic engineering (TE) system, there is a scenario in which a network device establishes a communication connection to an active-active or multi-active network device. For example, a provider edge (PE) is used as an example. A PE1 establishes a communication connection to a PE2 and a PE3, and the PE2 and the PE3 are aliasing devices for the PE1. In other words, when the PE2 and the PE3 are active-active devices for the PE1, for same traffic, the PE1 may load balance traffic to the PE2 and the PE3 for route forwarding. If specific traffic needs to meet a specific service level agreement, and only one of the PE2 and the PE3, for example, only the PE2, can implement traffic forwarding of the specific service level agreement, the PE1 may load balance the specific traffic to the PE3 for traffic forwarding. As a result, the specific traffic cannot match a required forwarding policy. This reduces traffic forwarding efficiency, and further affects service processing efficiency.

In conclusion, how to match a forwarding policy that meets a requirement in the foregoing scenario in which the network device establishes the communication connection to the active-active or multi-active network device, to improve traffic forwarding efficiency is a technical problem that needs to be resolved by persons skilled in the art.

SUMMARY

This application provides a traffic forwarding processing method and a device, to match a forwarding policy that meets a requirement in a scenario in which a network device establishes a communication connection to an active-active or multi-active network device, to improve traffic forwarding efficiency.

According to a first aspect, this application provides a traffic forwarding processing method. The method includes:

A first network device receives a first packet from a second network device, where the first packet includes a media access control (MAC) address of a destination device and a color identifier of the MAC address.

The first network device obtains an address of a third network device. The destination device is multi-homed to the second network device and the third network device. In other words, the destination device is directly multi-homed to the second network device and the third network device, or the destination device is multi-homed to the second network device and the third network device by using another device.

The first network device determines a first forwarding policy based on the address of the third network device and the color identifier, and forwards, to the third network device according to the first forwarding policy, traffic destined for the MAC address.

In this application, the second network device and the third network device are dual-homing active-active devices for the first network device. In an Ethernet virtual private network (EVPN) scenario, the second network device and the third network device are mutual aliasing devices. A first forwarding policy that meets a specific level service agreement is configured between the first network device and the third network device, and a second forwarding policy that meets the specific level service agreement is configured between the first network device and the second network device. The first forwarding policy and the second forwarding policy may be used to forward traffic destined for the MAC address of the destination device, and a color of the first forwarding policy is the same as that of the second forwarding policy. Therefore, the first network device may find the first forwarding policy and the second forwarding policy based on routing information such as the first packet sent by one of the second network device and the third network device, and establish a forwarding entry according to the first forwarding policy and the second forwarding policy, so that the first network device may forward, to the third network device based on the established forwarding entry and the first forwarding policy, a first part of the traffic destined for the MAC address of the destination device, and forward, to the second network device according to the second forwarding policy, a second part of the traffic destined for the MAC address of the destination device. In other words, this application can be used to match a forwarding policy that meets a requirement in a scenario in which a network device establishes a communication connection to an active-active or multi-active network device, to improve traffic forwarding efficiency.

This application may also be applied to a multi-active device scenario. In this application, two devices of the multi-active device are used as an example for description.

In a possible implementation, that the first network device obtains an address of a third network device includes:

The first network device determines to constitute one or more network devices of a multi-homing device of the destination device together with the second network device, where the one or more network devices include the third network device.

The first network device obtains an address of the one or more network devices.

In this application, the third network device and the second network device jointly constitute the multi-homing device of the destination device. In an EVPN multi-homing multi-active application scenario, the third network device may also be referred to as an alias device of the second network device that establishes a communication connection to the first network device. After receiving the first packet, the first network device may find an address of one or more alias devices of the second network device through pre-configuration or an auto-discovery mechanism. The one or more alias devices include the third network device. The auto-discovery mechanism includes one or more of an auto-discovery per Ethernet segment route (AD per ES) mechanism and an auto-discovery per Ethernet virtual private network instance route (AD per EVI) mechanism.

In a possible implementation, the first packet further includes an identifier corresponding to the address of the third network device, and that the first network device obtains an address of a third network device includes:

When the identifier includes the address of the third network device, the first network device parses the identifier to obtain the address of the third network device.

Alternatively, when the identifier is an identifier indicating the address of the third network device, the first network device finds the address of the third network device based on the identifier.

In this application, the address of the third network device may be obtained without the pre-configuration or the auto-discovery mechanism, to determine the first forwarding policy. In addition, this application may further be used to match a forwarding policy that meets a requirement in the scenario in which the network device establishes the communication connection to the active-active or multi-active network device, to improve traffic forwarding efficiency.

In a possible implementation, the MAC address and the color identifier in the first packet received by the first network device from the second network device are from the third network device. In this implementation, the second network device may first obtain the MAC address and a corresponding color identifier that are sent by the third network device who forms the multi-homing device with the second network device. The MAC address is a MAC address obtained by the third network device from the destination device, and then the third network device determines the color identifier corresponding to the MAC address. The second network device may send the MAC address and the color identifier obtained from the third network device, and other MAC addresses and corresponding other color identifiers learned by the second network device to the first network device, so that the first network device determines a corresponding forwarding policy for the second network device based on the obtained MAC address and the color identifier, and the other MAC addresses and the corresponding other color identifiers.

In a possible implementation, that the forwarding, to the third network device according to the first forwarding policy, traffic destined for the MAC address includes:

The first network device establishes a forwarding entry based on the MAC address, the address of the third network device, and the first forwarding policy, where the forwarding entry indicates to forward the traffic according to the first forwarding policy.

The first network device forwards the traffic to the third network device based on the forwarding entry.

In a possible implementation, the first packet further includes a route target and a virtual private network identifier.

In this application, the route target included in the first packet may be used to match a corresponding forwarding instance, and the virtual private network identifier may be used to match a corresponding dedicated network when the traffic is forwarded, so that the traffic can be forwarded successfully.

In a possible implementation, the traffic forwarded to the third network device according to the first forwarding policy and destined for the MAC address is a first part of the traffic destined for the MAC address, and the first packet further includes an address of the second network device. The method further includes:

The first network device determines a second forwarding policy based on the address of the second network device and the color identifier.

The first network device forwards, to the second network device according to the second forwarding policy, a second part of the traffic destined for the MAC address.

This application describes a process in which the first network device forwards, to the second network device, the traffic destined for the MAC address of the destination device. In this application, the first network device may load balance the traffic to the second network device and the third network device, to improve traffic forwarding efficiency and alleviate forwarding burden of the network device.

According to a second aspect, this application provides a traffic forwarding processing method applied to a first system. The first system includes a first network device, a second network device, a third network device, and a first destination device. The first destination device is multi-homed to the second network device and the third network device. The method includes:

The first network device receives a second packet from the third network device, where the second packet includes a first media access control (MAC) address of the first destination device, a first color identifier of the first MAC address, and an address of the third network device. The first MAC address and the first color identifier in the second packet sent by the third network device are obtained by the third network device from the second network device.

The first network device determines a first forwarding policy based on the address of the third network device and the first color identifier, and forwards, to the third network device according to the first forwarding policy, traffic destined for the first MAC address.

In this application, even if the third network device cannot configure the first color identifier for the first MAC address of the destination device, the first network device may configure a corresponding forwarding policy for the third network device based on the first MAC address and the first color identifier that are obtained by the second network device and that are included in the second packet sent by the third network device, to match a forwarding policy that meets a requirement in a scenario in which a network device establishes a communication connection to an active-active or multi-active network device, to improve traffic forwarding efficiency.

In a possible implementation, that the first MAC address and the first color identifier are obtained by the third network device from the second network device includes:

The first MAC address and the first color identifier are obtained by the third network device from a type-length-value (TLV) field of a packet sent by the second network device.

In this application, a TLV field is newly defined to send a MAC address between alias devices and configure a color identifier for the MAC address.

In a possible implementation, the method further includes:

The first network device receives a third packet from the second network device, where the third packet includes the first MAC address and the first color identifier.

The first network device determines a second forwarding policy based on the first MAC address and the first color identifier in the third packet, and forwards, to the second network device according to the second forwarding policy, traffic destined for the first MAC address.

In this application, after sending the first MAC address and the first color identifier to an alias device such as the third network device, the second network device may further send the first MAC address and the first color identifier as a route of the second network device to the first network device, so that the first network device matches a corresponding forwarding policy based on the third packet sent by the second network device and establishes a forwarding entry.

In a possible implementation, the first system further includes a second destination device. The second packet and the third packet each further include a second MAC address of the second destination device and a second color identifier of the second MAC address, and the second MAC address and the second color identifier are from the third network device.

In this application, the alias devices, for example, the second network device and the third network device, may receive MAC addresses and color identifiers sent by each other, and then send the received MAC addresses and color identifiers as routes of the second network device and the third network device to the first network device, so that the first network device is configured to match a corresponding forwarding policy and establish a forwarding entry.

In a possible implementation, the second packet further includes a route target and a virtual private network identifier.

In this application, the route target included in the first packet may be used to match a corresponding forwarding instance, and the virtual private network identifier may be used to match a corresponding dedicated network when the traffic is forwarded, so that the traffic can be forwarded successfully.

According to a third aspect, this application provides a traffic forwarding processing method applied to a first system. The first system includes a first network device, a second network device, a third network device, and a destination device. The destination device is multi-homed to the second network device and the third network device. The method includes:

The second network device sends a first packet to the first network device, where the first packet includes a media access control (MAC) address of the destination device and a color identifier of the MAC address. The first packet further includes an address of the third network device or further includes an identifier indicating the address of the third network device. The first packet instructs the first network device to determine a first forwarding policy, and the first forwarding policy is used to forward, to the third network device, traffic destined for the MAC address.

In a possible implementation, the MAC address and the color identifier in the first packet are from the third network device.

In a possible implementation, the first packet further includes a route target and a virtual private network identifier.

According to a fourth aspect, this application provides a traffic forwarding processing method applied to a first system. The first system includes a first network device, a second network device, a third network device, and a first destination device. The first destination device is multi-homed to the second network device and the third network device. The method includes:

The third network device receives a fourth packet from the second network device. The fourth packet includes a first media access control (MAC) address of the first destination device and a first color identifier of the first MAC address.

The third network device sends a second packet to the first network device, where the second packet includes the first MAC address and the first color identifier. The second packet instructs the first network device to determine a first forwarding policy, and the first forwarding policy is used to forward, to the third network device, traffic destined for the MAC address.

In a possible implementation, the first MAC address and the first color identifier are carried in a type-length-value (TLV) field in the fourth packet.

In a possible implementation, the first system further includes a second destination device. The method further includes:

The third network device sends a second MAC address of the second destination device and a second color identifier of the second MAC address to the second network device.

That the third network device sends a second packet to the first network device includes:

The third network device sends the second packet including the first MAC address, the first color identifier, the second MAC address, and the second color identifier to the first network device.

In a possible implementation, the second packet further includes a route target and a virtual private network identifier.

According to a fifth aspect, this application provides a traffic forwarding processing method applied to a first system. The first system includes a first network device, a second network device, a third network device, and a first destination device. The first network device is multi-homed to the second network device and the third network device. The method includes:

The second network device sends a fourth packet to the third network device, where the fourth packet includes a first media access control (MAC) address of the first destination device and a first color identifier of the first MAC address. The first MAC address and the first color identifier instruct the third network device to send a second packet to the first network device. The second packet includes the first MAC address and the first color identifier.

In a possible implementation, the first system further includes a second destination device. The method further includes:

The second network device receives a second MAC address of the second destination device and a second color identifier of the second MAC address from the third network device.

The second network device sends a third packet to the first network device, where the third packet includes the first MAC address, the first color identifier, the second MAC address, and the second color identifier.

In a possible implementation, the first MAC address and the first color identifier are carried in a type-length-value (TLV) field in the fourth packet.

According to a sixth aspect, this application provides a traffic forwarding processing apparatus. The apparatus includes:

a receiving unit, configured to receive a first packet from a second network device, where the first packet includes a first information, and the first information includes a media access control (MAC) address of a destination device and a color identifier of the MAC address;

an obtaining unit, configured to obtain an address of a third network device, where the destination device is multi-homed to the second network device and the third network device;

a determining unit, configured to determine a first forwarding policy based on the address of the third network device and the color identifier; and a forwarding unit, configured to forward, to the third network device according to the first forwarding policy, traffic destined for the MAC address.

In a possible implementation, the obtaining unit is specifically configured to:

determine to constitute one or more network devices of a multi-homing device of the destination device together with the second network device, where the one or more network devices include the third network device; and obtain an address of the one or more network devices.

In a possible implementation, that the obtaining unit determines to constitute one or more network devices of a multi-homing device of the destination device together with the second network device is specifically:

finding an address of one or more alias devices of the second network device based on an auto-discovery mechanism, where the one or more alias devices include the third network device, and the auto-discovery mechanism includes one or more of an auto-discovery per Ethernet segment route AD per ES mechanism and an auto-discovery per Ethernet virtual private network instance route AD per EVI mechanism.

In a possible implementation, the first packet further includes an identifier corresponding to the address of the third network device, and the obtaining unit is specifically configured to:

when the identifier includes the address of the third network device, parse the identifier to obtain the address of the third network device; or when the identifier is an identifier indicating the address of the third network device, find the address of the third network device based on the identifier.

In a possible implementation, the MAC address and the color identifier in the first packet received by the receiving unit from the second network device are from the third network device.

In a possible implementation, the forwarding unit is specifically configured to:

establish a forwarding entry based on the MAC address, the address of the third network device, and the first forwarding policy, where the forwarding entry indicates to forward the traffic according to the first forwarding policy; and forward the traffic to the third network device based on the forwarding entry.

In a possible implementation, the first packet further includes a route target and a virtual private network identifier.

In a possible implementation, the traffic forwarded to the third network device according to the first forwarding policy and destined for the MAC address is a first part of the traffic destined for the MAC address, and the first packet further includes an address of the second network device.

The determining unit is further configured to determine a second forwarding policy based on the address of the second network device and the color identifier.

The forwarding unit is further configured to forward, to the second network device according to the second forwarding policy, a second part of the traffic destined for the MAC address.

According to a seventh aspect, this application provides a traffic forwarding processing apparatus. The apparatus is a first network device in a first system, or a chip or a processing system of the first network device, or the like. The first system further includes a second network device, a third network device, and a first destination device. The first destination device is multi-homed to the second network device and the third network device. The apparatus includes:

a receiving unit, configured to receive a second packet from the third network device, where the second packet includes a first media access control (MAC) address of the first destination device, a first color identifier of the first MAC address, and an address of the third network device, and the first MAC address and the first color identifier in the second packet sent by the third network device are obtained by the third network device from the second network device; and a determining unit, configured to determine a first forwarding policy based on the address of the third network device and the first color identifier, and forward, to the third network device according to the first forwarding policy, traffic destined for the first MAC address.

In a possible implementation, that the first MAC address and the first color identifier are obtained by the third network device from the second network device includes:

The first MAC address and the first color identifier are obtained by the third network device from a type-length-value (TLV) field of a packet sent by the second network device.

In a possible implementation, the receiving unit is further configured to receive a third packet from the second network device, where the third packet includes a third packet, and the third packet includes the first MAC address and the first color identifier.

The determining unit is further configured to determine a second forwarding policy based on the first MAC address and the first color identifier in the third packet, and forward, to the second network device according to the second forwarding policy, traffic destined for the first MAC address.

In a possible implementation, the first system further includes a second destination device. The second packet and the third packet each further include a second MAC address of the second destination device and a second color identifier of the second MAC address, and the second MAC address and the second color identifier are from the third network device.

In a possible implementation, the second packet further includes a route target and a virtual private network identifier.

According to an eighth aspect, this application provides a traffic forwarding processing apparatus. The traffic forwarding processing apparatus is a second network device in a first system, or a chip or a processing system of the second network device, or the like. The first system further includes a first network device, a third network device, and a destination device. The destination device is multi-homed to the second network device and the third network device. The apparatus includes:

a sending unit, configured to send a first packet to the first network device, where the first packet includes a media access control (MAC) address of a destination device and a color identifier of the MAC address, and the first packet further includes an address of the third network device or further includes an identifier indicating an address of the third network device. The first packet instructs the first network device to determine a first forwarding policy, and the first forwarding policy is used to forward, to the third network device, traffic destined for the MAC address.

In a possible implementation, the MAC address and the color identifier in the first packet are from the third network device.

In a possible implementation, the first packet further includes a route target and a virtual private network identifier.

According to a ninth aspect, this application provides a traffic forwarding processing apparatus. The traffic forwarding processing apparatus is a third network device in a first system, a chip or a processing system of the third network device, or the like. The first system further includes a first network device, a second network device, and a first destination device. The first destination device is multi-homed to the second network device and the third network device. The apparatus includes:

a receiving unit, configured to receive a fourth packet from the second network device, where the fourth packet includes a first media access control (MAC) address of the first destination device and a first color identifier of the first MAC address; and a sending unit, configured to send a second packet to the first network device, where the second packet includes the first MAC address and the first color identifier, the second packet instructs the first network device to determine a first forwarding policy, and the first forwarding policy is used to forward, to the third network device, traffic destined for the MAC address.

In a possible implementation, the first MAC address and the first color identifier are carried in a type-length-value (TLV) field in the fourth packet.

In a possible implementation, the first system further includes a second destination device.

The sending unit is further configured to send a second MAC address of the second destination device and a second color identifier of the second MAC address to the second network device.

That the sending unit sends the second packet to the first network device is specifically as follows.

The sending unit sends the second packet including the first MAC address, the first color identifier, the second MAC address, and the second color identifier to the first network device.

In a possible implementation, the second packet further includes a route target and a virtual private network identifier.

According to a tenth aspect, this application provides a traffic forwarding processing apparatus. The traffic forwarding processing apparatus is a second network device in a first system, a chip or a processing system of the second network device, or the like. The first system further includes a first network device, a third network device, and a first destination device. The first network device is multi-homed to the second network device and the third network device. The apparatus includes:

a sending unit, configured to send a fourth packet to the third network device, where the fourth packet includes a first media access control (MAC) address of the first destination device and a first color identifier of the first MAC address, the first MAC address and the first color identifier instruct the third network device to send a second packet to the first network device, and the second packet includes the first MAC address and the first color identifier.

In a possible implementation, the first system further includes a second destination device. The traffic forwarding processing apparatus further includes:

a receiving unit, configured to receive a second MAC address of the second destination device and a second color identifier of the second MAC address from the third network device; and the sending unit is further configured to send a third packet to the first network device, where the third packet includes the first MAC address, the first color identifier, the second MAC address, and the second color identifier.

In a possible implementation, the first MAC address and the first color identifier are carried in a type-length-value (TLV) field in the fourth packet.

According to an eleventh aspect, this application provides a device, including a processor, a communication interface, and a memory. The memory is configured to store program instructions and/or data, and the processor is configured to execute the program instructions stored in the memory, so that the device performs the method according to any one of claims 1 to 8.

According to a twelfth aspect, this application provides a device, including a processor, a communication interface, and a memory. The memory is configured to store program instructions and/or data, and the processor is configured to execute the program instructions stored in the memory, so that the device performs the method according to any one of claims 9 to 16.

According to a thirteenth aspect, this application provides a device, including a processor, a communication interface, and a memory. The memory is configured to store program instructions and/or data, and the processor is configured to execute the program instructions stored in the memory, so that the device performs the method according to any one of claims 17 to 19.

According to a sixteenth aspect, this application provides a system, where the system includes a first network device and a second network device. The first network device is the device according to the eleventh aspect, and the second network device is the device according to the thirteenth aspect.

According to a seventeenth aspect, this application provides a system, where the system includes a first network device, a second network device, and a third network device. The first network device is the device according to the twelfth aspect, the second network device is the device according to the fifteenth aspect, and the third network device is the device according to the fourteenth aspect.

According to an eighteenth aspect, this application provides a computer-readable storage medium, where the computer-readable storage medium stores a computer program. The computer program is executed by a processor to implement the method according to any one of claims 1 to 8, or the computer program is executed by a processor to implement the method according to any one of claims 9 to 16, or the computer program is executed by a processor to implement the method according to any one of claims 17 to 19.

According to a nineteenth aspect, this application provides a computer program product.

When the computer program product is read and executed by a computer, the method according to any one of claims 1 to 8 is executed.

Alternatively, when the computer program product is read and executed by a computer, the method according to any one of claims 9 to 16 is executed.

Alternatively, when the computer program product is read and executed by a computer, the method according to any one of claims 17 to 19 is executed.

In conclusion, this application can be used to match a forwarding policy that meets a requirement in a scenario in which a network device establishes a communication connection to an active-active or multi-active network device, to improve traffic forwarding efficiency.

DETAILED DESCRIPTION OF ILLUSTRATIVE EMBODIMENTS

The following describes the technical solutions in embodiments of this application with reference to the accompanying drawings.

Figure 1:
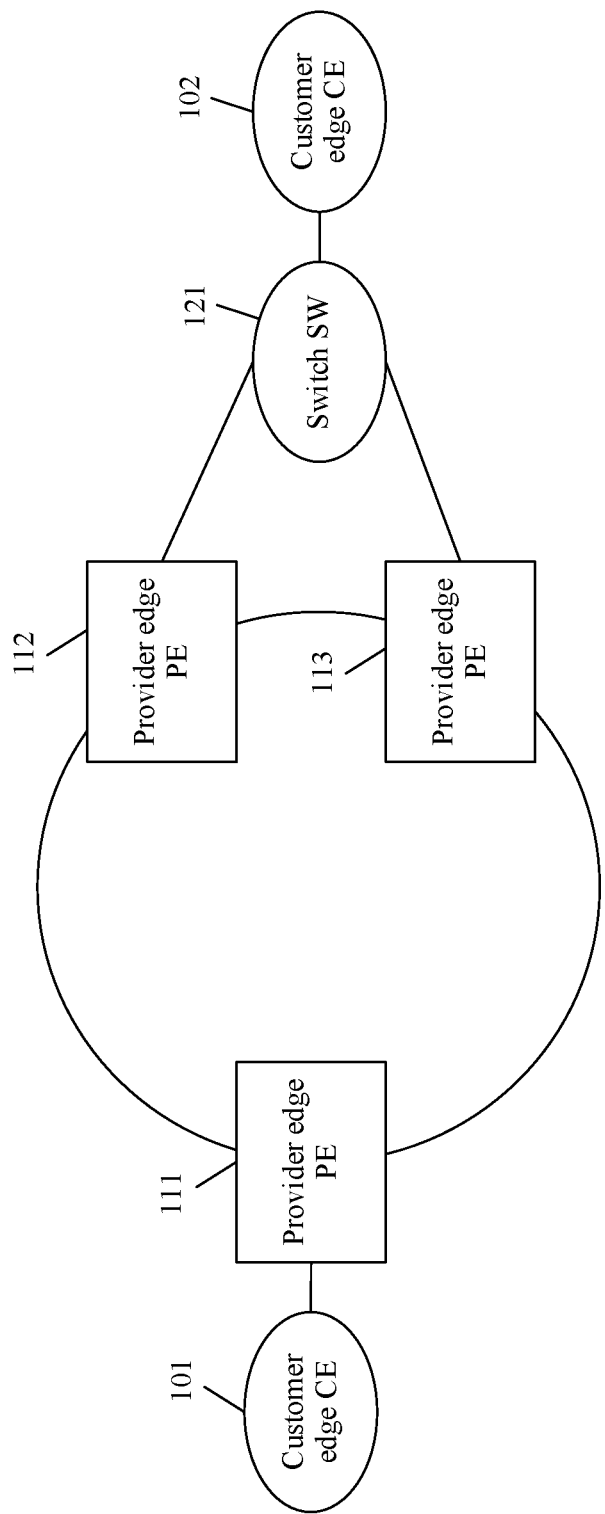
FIG. 1 to FIG. 3 each are a schematic diagram of a system scenario to which a traffic forwarding processing method is applicable according to this application.

To better understand a traffic forwarding processing method provided in embodiments of the present disclosure, the following first describes an example of a scenario to which embodiments of the present disclosure are applicable. FIG. 1 is a schematic diagram of a system architecture to which a traffic forwarding processing method is applicable according to an embodiment of the present disclosure.

As shown in FIG. 1, the system architecture may include a customer edge 101, a customer edge 102, a provider edge 111, a provider edge 112, a provider edge 113, and a switch 121.

The customer edge 101 is connected to the provider edge 111, and the provider edge 111 separately establishes a communication connection to the provider edge 112 and the provider edge 113. In another possible implementation, the provider edge 111 may further establish a communication connection to another provider edge.

The switch 121 is dual-homed to the provider edge 112 and the provider edge 113, and the customer edge 102 is connected to the switch 121. Because the customer edge 102 accesses the provider edge 112 and the provider edge 113 by using the switch 121, it may also be considered as that the customer edge 102 is dual-homed to the provider edge 112 and the provider edge 113. In another possible implementation, the customer edge 102 may further access another provider edge by using the switch 121. In this case, the customer edge 102 may be multi-homed to the provider edge 112, the provider edge 113, and the another provider edge. In another possible scenario, the customer edge 102 may alternatively directly access the provider edge 112 and the provider edge 113 without using the switch 121.

The customer edge (CE) is a subscriber router or switch connected to a service provider. The CE is connected to one or more provider edges (PE) to provide service access for a user. The CE may establish an adjacency relationship with the connected PE, for example, establish a border gateway protocol (BGP) neighbor, or establish an open shortest path first (OSPF) neighbor, or establish an intermediate system to intermediate system (IS-IS) link-state routing protocol neighbor. The customer edge 101 and the customer edge 102 may be respectively referred to as a CE101 and a CE102 for short.

The provider edge PE may alternatively be a router or a switch, and the PE may be configured to connect the CE device and a provider backbone network device. User traffic flows to a user network through the PE or to a backbone network through the PE. The provider edge 11, the provider edge 112, and the provider edge 113 may be respectively referred to as a PE111, a PE112, and a PE113 for short.

The switch (SW) may provide an exclusive electrical signal path for any two network nodes that access the switch. The switch 121 may be referred to as an SW121 for short.

A network in which the PE111, the PE112, and the PE113 are located may be a network in which segment routing (SR) is applied to an internet protocol version 6 (IPv6) data plane, and may be referred to as an SRv6 network.

Alternatively, a network in which the PE111, the PE112, and the PE113 are located may be a network in which SR is applied to a multi-protocol label switching (MPLS) data plane, and may be referred to as an SR-MPLS network.

In the SRv6 network, the PE111, the PE112, and the PE113 may implement traffic forwarding through a tunnel with endpoint and color properties, such as an SRv6 segment routing (SR) policy or an SRv6 segment routing-traffic engineering tunnel (SR-TE Tunnel) in a traffic engineering (TE) system. The SRv6 SR Policy is an SRv6-based forwarding policy system that can implement automatic traffic diversion of traffic routing. The SRv6 SR-TE tunnel is an SRv6-based tunnel interface system. Traffic can be forwarded only after a tunnel is configured between devices.

Similarly, in the SR-MPLS network, the PE111, the PE112, and the PE113 may implement traffic forwarding through a tunnel with endpoint and color properties, such as an MPLS SR Policy or an MPLS SR-TE Tunnel in a TE system. The MPLS SR Policy is an MPLS-based forwarding policy system that can implement automatic traffic diversion of traffic routing. The MPLS SR-TE Tunnel is an MPLS-based tunnel interface system. Traffic can be forwarded only after a tunnel is configured between devices.

In this embodiment of this application, an SR Policy is used as an example for description. Another tunnel with endpoint and color properties, such as an SR-TE tunnel, is similar to the SR Policy. Details are not described again. The SR Policy includes the following 3-tuple identifiers:

Headend: The headend is a place in which the SR Policy is generated and implemented. For example, the headend may be the PE111 shown in FIG. 1.

Endpoint: The endpoint is an endpoint of the SR Policy, and is an IPv4 or IPv6 address. For example, the endpoint may be the PE112 or the PE113 shown in FIG. 1.

Color: The color corresponds to any 32-bit value used to distinguish between a plurality of SR Policies between a same headend and endpoint pair. Different colors correspond to different values, and the values may be referred to as color identifiers.

On a specified headend node, the SR Policy is identified by a 2-tuple (color, headend). A candidate path of the SR Policy indicates a specific mode in which traffic is transmitted from the headend to the endpoint of the SR Policy. Each candidate path has a preference value. A path with a higher preference value is preferred. The SR Policy has at least one candidate path, and a valid candidate path with the highest preference value is an active candidate path. A segment list of the SR Policy is a segment list of an active path of the SR Policy. Each candidate path may have one or more segment lists, and each segment list has an associated load balancing weight. Traffic steered to this path is load balanced among all valid segment lists of the candidate path based on a weight ratio.

It should be noted that the system architecture shown in FIG. 1 is merely an example. For example, one or more PEs may be further included on a link between the PE111 and the PE112, and one or more PEs may be further included on a link between the PE111 and the PE113. The system architecture to which the traffic forwarding processing method provided in this embodiment of this application is applicable is not limited to the foregoing descriptions. Any scenario to which the traffic forwarding processing method provided in this embodiment of this application is applicable, for example, a dual-homing or multi-homing scenario of a network device, is a scenario to which this embodiment of this application is applicable. Details are not described herein again. The network device in this embodiment of this application may include a router or a device having a routing function, for example, a layer 3 switch.

Before the traffic forwarding processing method provided in this application is described, a problem that traffic cannot match a needed forwarding path in a scenario in which a network device establishes a communication connection to an active-active or multi-active network device is first described as an example.

Figure 2:
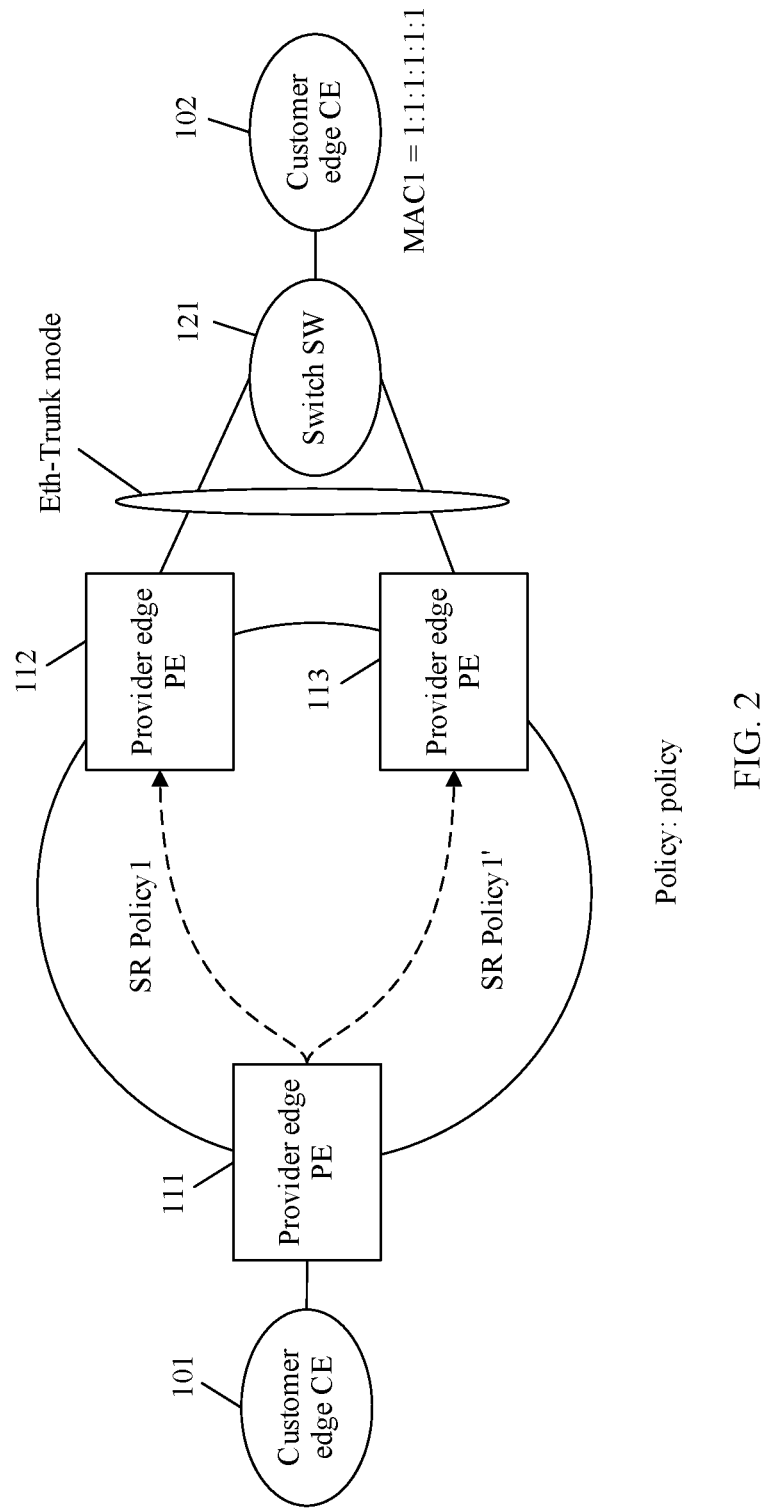

Refer to FIG. 2. FIG. 2 is obtained by adding related information based on FIG. 1. Therefore, the foregoing descriptions of FIG. 1 are applicable to FIG. 2. In FIG. 2, for a PE111, a PE112 and a PE113 may be in a virtual private local area network service (VPLS) active-active state or may be in a virtual private network (VPN) active-standby state. In other words, for the PE111, the PE112 is an aliasing device of the PE113. Similarly, the PE113 is an alias device of the PE112. The VPLS may be a service in an Ethernet virtual private network (EVPN). The VPLS active-active state, the VPN active-standby state, or that the PE112 and the PE113 are mutual alias devices indicates that the PE111 may not only load balance traffic to the PE112 for forwarding, but also load balance the traffic to the PE113 for forwarding. The traffic may include service traffic, control traffic, or the like.

In addition, in FIG. 2, an SR Policy1 is configured between the PE111 and the PE112, and an SR Policy1' is configured between the PE111 and the PE113. The SR Policy1 may be a default policy configured between the PE111 and the PE112, and the SR Policy1' may be a default policy configured between the PE111 and the PE113. The SR Policy1 and the SR Policy1' may be used to serve an entire virtual private local area network service VPLS, to be specific, used to forward traffic of the virtual private local area network service VPLS. For example, for the SR Policy1, because a headend is already the PE111, the SR Policy1 may be identified by using a color and an endpoint. It is assumed that the color is blue, an identifier of the blue is 20, the endpoint is the PE112, and an IP address of the PE112 is 1.1.1.3, "blue (20), 1.1.1.3" may be used to identify the SR Policy1.

FIG. 2 shows a media access control (MAC) address MAC1=1:1:1:1:1:1 of a CE102. The MAC address may also be referred to as a local area network (LAN) address, an Ethernet address, or a physical address.

The SR Policy1 and the SR Policy1' may be used to carry unicast traffic and broadcast, unknown unicast, and multicast (BUM) traffic.

For the unicast traffic, the PE111 may match a corresponding outbound interface based on 5-tuple information of a packet in the traffic, to carry the traffic on the SR Policy1 or SR Policy1' and send the traffic to a corresponding next-hop device, for example, the PE112 or the PE113, and then the PE112 or the PE113 performs next-step forwarding, for example, forwards the traffic to an SW121. A 5-tuple is a set of five elements: a source internet protocol (IP) address, a source port, a destination IP address, a destination port, and a transport layer protocol.

For the BUM traffic, similarly, the PE111 may match a corresponding outbound interface based on 5-tuple information of a packet in the traffic, to carry the traffic on the SR Policy1 or SR Policy1' and send the traffic to a corresponding next-hop device. However, the PE112 or PE113 needs to determine, depending on whether the PE112 or PE113 is a designated forwarder (DF), whether to continue to forward the BUM traffic. For example, it is assumed that the PE112 is a designated forwarder DF, and the PE113 is a non-designated forwarder (NDF), the PE112 may continue to forward the received BUM traffic, for example, forward the BUM traffic to the SW121, and the PE113 discards the received BUM traffic.

In addition, in FIG. 2, the SW121 is configured in an Eth-Trunk mode. In the Eth-Trunk mode, a plurality of Ethernet physical links are bundled together to form a logical link, to increase link bandwidth. Network devices connected to the bundled Ethernet physical links belong to a same Ethernet segment (ES). In addition, the bundled links dynamically back up each other, which greatly improves link reliability. To be specific, the SW121 bundles links to the PE112 and the PE113 together to form a logical link, so that the PE112 and the PE113 belong to a same ES. For the SW121, the links to the PE112 and the PE113 are a same link. When forwarding a packet, the SW121 can forward the packet only to the PE112 or the PE113, but cannot forward the packet to the PE112 and the PE113 simultaneously.

In this embodiment of this application, a CE101 or user equipment connected to the CE101 may be a source device of traffic, and the CE102 or user equipment connected to the CE102 may be a destination device of traffic. The source device is a device that generates traffic and sends the traffic, and the destination device is a device indicated by a destination address to which the traffic finally reaches. Based on the foregoing descriptions of FIG. 2, when traffic sent from the source device such as the CE101 to the destination device such as the CE102 needs to meet a specific service level agreement (SLA), an independent forwarding policy needs to be established between the PE111 and the PE112. The forwarding policy may be referred to as an SR Policy2. Similarly, an SR Policy2' may be established between the PE111 and the PE113. The SR Policy2 and the SR Policy2' can meet a requirement of the specific service level agreement. For example, the specific service level agreement may be, for example, a bandwidth of 200 Mbps, and a delay of less than 20 ms. For a schematic diagram of establishing the SR Policy2 between the PE111 and the PE112 and establishing the SR Policy2' between the PE111 and the PE113, refer to FIG. 3.

In addition, a same color is configured for the SR Policy2 and the SR Policy2', in other words, the two forwarding policies have a same color identifier.

To enable traffic destined for a MAC1 to be carried on the SR Policy2 and/or SR Policy2' on the PE111 for forwarding, in other words, to forward, according to the SR Policy2 and/or SR Policy2', the traffic destined for the MAC1, the PE112 and the PE113 need to obtain the MAC1 from the SW121 (where the SW121 obtains the MAC1 from a CE2), and color the MAC1, to be specific, configure a color identifier for the MAC1. The color identifier is the same as that of the SR Policy2 and the SR Policy2'. Then, the PE112 and the PE113 send a route of the MAC1 to the PE111.

However, because the Eth-Trunk mode is configured for the SW121, the MAC1 can be sent to only one of the PE112 and the PE113. It is assumed that the MAC1 is sent to the PE112, only the PE112 colors the MAC1 and sends the route of the MAC1 to the PE111. After receiving the route of the MAC1, the PE111 establishes a forwarding entry based on the route. The forwarding entry indicates to forward, according to the SR Policy2 between the PE111 and the PE112, the traffic destined for the MAC1. In other words, when the PE111 forwards the traffic destined for the MAC1, the PE111 may enable the traffic destined for the MAC1 to be carried on the SR Policy2 and sent to the PE112.

Because the PE113 does not send the route of the MAC1 to the PE111, the PE111 does not establish the forwarding entry indicating the PE111 to forward, according to the SR Policy2' between the PE111 and the PE113, the traffic destined for the MAC1. In addition, the PE112 and the PE113 are alias devices, and the PE111 sends the traffic destined for the MAC1 to the PE112 and PE113 for forwarding. Therefore, the PE111 can send the traffic destined for the MAC1 to the PE113 only using the SR Policy1'. As a result, the foregoing specific service level agreement cannot be met, traffic forwarding efficiency is reduced, and service processing efficiency is further affected.

To resolve this problem, this application provides a traffic forwarding processing method. The following describes, by using several embodiments, the traffic forwarding processing method provided in this application.

Embodiment 1

Figure 3:
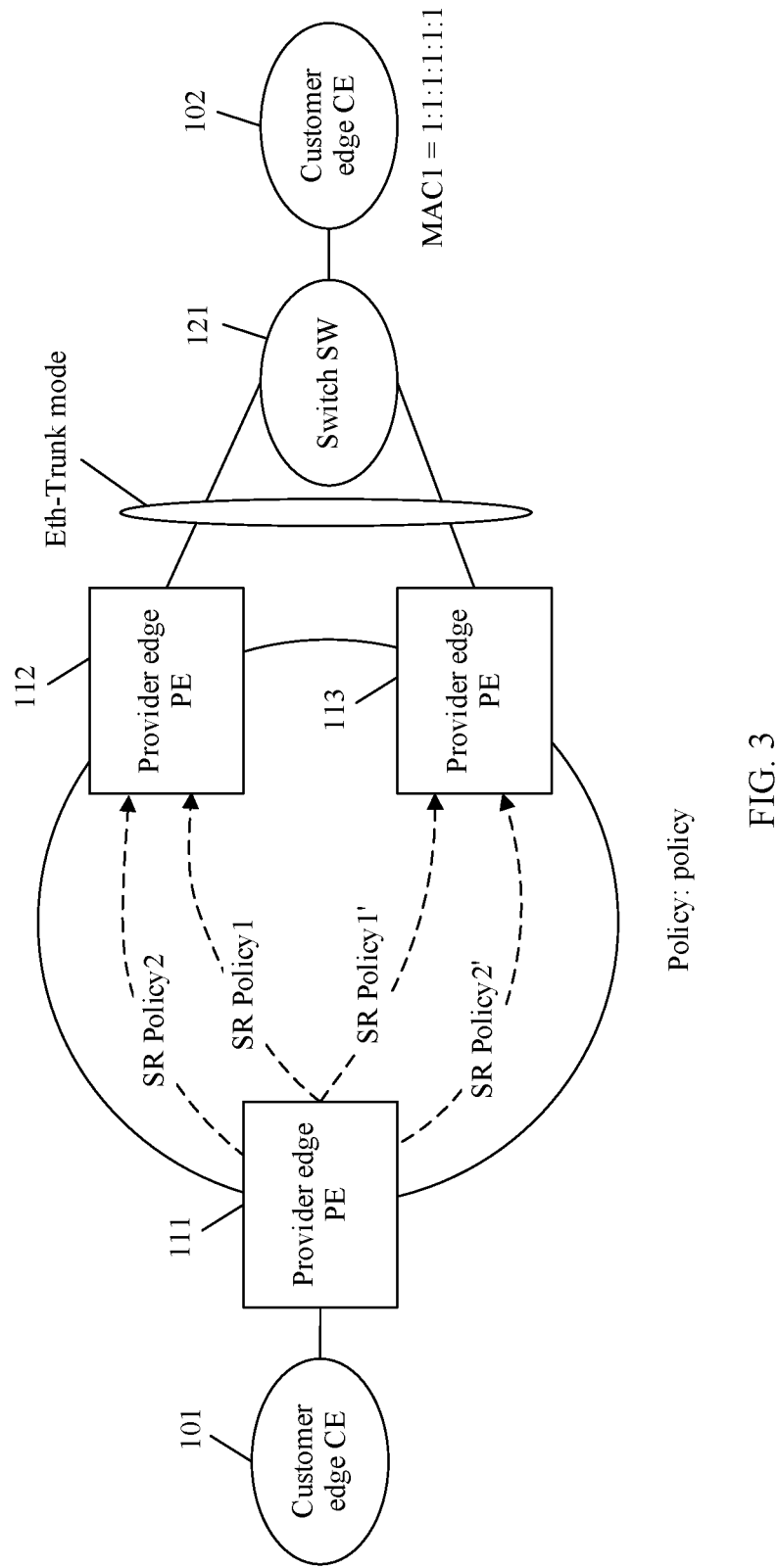
Figure 4:
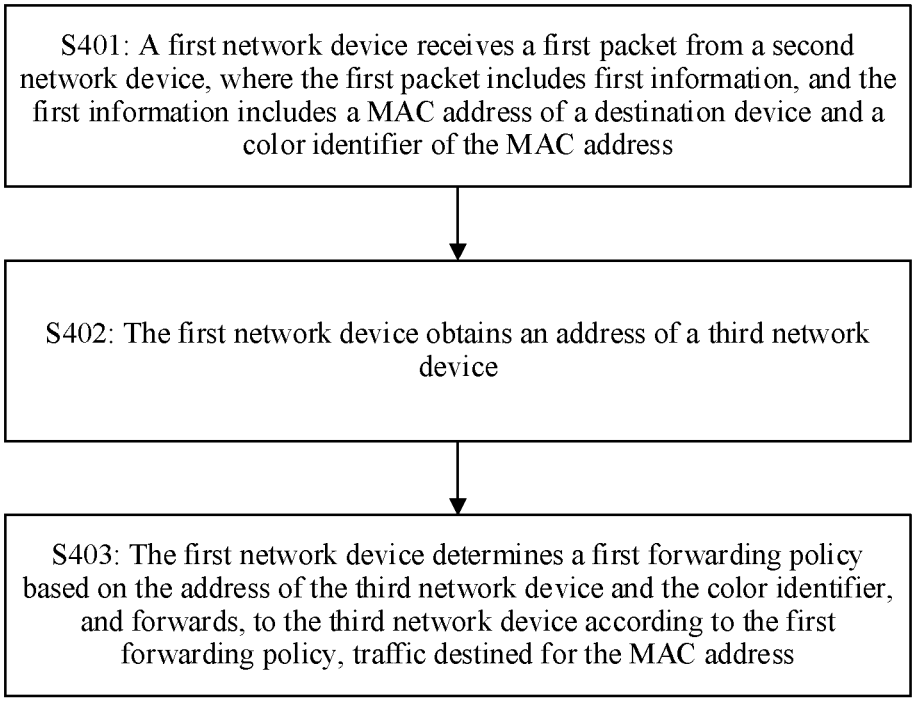
FIG. 4 is a schematic flowchart of a traffic forwarding processing method according to an embodiment of this application.

For a traffic processing method provided in this embodiment, refer to FIG. 4. The method may be applied to the scenarios shown in FIG. 2 and FIG. 3, to resolve the problem that the specific service level agreement cannot be met. The method may include but is not limited to the following steps.

S401: A first network device receives a first packet from a second network device, where the first packet includes first information, and the first information includes a MAC address of a destination device and a color identifier of the MAC address.

For example, the first network device may be the PE111, the second network device may be the PE112, a third network device may be the PE113, the destination device may be the CE102 or a device connected to the CE102, and the MAC address of the destination device may be the MAC1. The second network device and the third network device are mutual alias devices for the first network device. In some scenarios, a device that is mutually aliased to the first network device and the second network device may further include another network device. The destination device is directly multi-homed to the second network device and the third network device, or the destination device is multi-homed to the second network device and the third network device by using another device. The destination device is multi-homed to the second network device and the third network device.

In a specific embodiment, the destination device floods the MAC address of the destination device to a switch according to a specific protocol such as a BGP protocol, an OSPF protocol, or an IS-IS protocol. The switch may be, for example, the foregoing SW121. The switch may be dual-homed to the second network device and the third network device, and the switch configures an Eth-Trunk mode for a link to the second network device and the third network device. Then, the switch sends the learned MAC address of the destination device to the second network device. Based on the foregoing descriptions, it can be learned that in the Eth-Trunk mode, the switch sends the MAC address only to one of the second network device and the third network device, and the switch does not send the learned MAC address of the destination device to the third network device.

After receiving the MAC address of the destination device, the second network device colors the MAC address, to be specific, configures the color identifier of the MAC address. It can be learned based on the foregoing descriptions that traffic destined for the MAC address needs to meet a specific level service agreement, and forwarding policies that meet the specific service level agreement have been established between the first network device and the second network device and between the first network device and the third network device. The forwarding policy that is established between the first network device and the third network device and that meets the specific service level agreement may be referred to as a first forwarding policy, and the forwarding policy that is established between the first network device and the second network device and that meets the specific service level agreement may be referred to as a second forwarding policy. The first forwarding policy may be, for example, the SR Policy2', and the second forwarding policy may be, for example, the SR Policy2. The first forwarding policy and the second forwarding policy have a same color identifier.

In this case, to enable the traffic destined for the MAC address of the destination device to be carried on the first forwarding policy and/or the second forwarding policy for forwarding, a color of the MAC address needs to be the same as a color of the first forwarding policy and a color of the second forwarding policy. Therefore, the color identifier of the MAC address configured by the second network device is the same as the color identifier of the first forwarding policy and the color identifier of the second forwarding policy.

After completing configuration of the color identifier of the MAC address, the second network device generates the first packet, and sends the first packet to the first network device. The first packet may include an address of the second network device, a route target (RT), the MAC address of the destination device, the configured color identifier of the MAC address, a network identifier of a first VPN, and the like. The MAC address and the color identifier of the MAC address are the first information. The first information is mainly used to describe specific content carried in the first packet, but is not used to limit a location at which the specific content is carried. For example, the MAC address and the color identifier of the MAC address included in the first information may be located in adjacent fields of the first packet, or may be located in non-adjacent fields of the first packet.

The address of the second network device may be a local loopback address of the second network device. The loopback address is a virtual interface, so that stability of a route can be ensured, and a link failure does not occur on the interface. Alternatively, the address of the second network device may be an internet protocol (IP) address of the second network device.

The route target included in the first information may be represented as an RT1, where the RT1 may be a route control identifier of an Ethernet virtual routing and forwarding (EVRF) instance, and is used to distribute and accept routing information on a forwarding plane. Generally, different EVRF instances are configured with different RTs. On a control plane, the RT1 identifies a VPN, and may be used to search for an alias device.

The EVRF instance may correspond to a forwarding table, and the forwarding table is generally formed according to a control-plane multi-protocol border gateway protocol (MP-BGP). The route target RT carried in the MP-BGP controls whether a locally received VPN route is stored in a local EVRF routing and forwarding table. After the EVRF routing and forwarding table is formed, and after a user-side (UNI) packet reaches a network device such as a router, the network device forwards a packet based on the EVRF routing and forwarding table.

The network identifier of the first VPN is mainly used to identify, on a forwarding plane, a VPN network in which the second network device is located. The network identifier of the first VPN may be a VPN segment identifier (SID), which may be referred to as a VPNSID1 for short, used by the second network device for an EVPN VPLS packet.

In addition, the third network device generates a packet including information such as an address of the third network device, an RT2, and a network identifier of a second VPN, and sends the packet to the first network device.

The address of the third network device may be a local loopback address of the third network device. Alternatively, the address of the third network device may be an IP address of the third network device.

The RT2 may be a label of another Ethernet virtual routing and forwarding (EVRF) instance. Alternatively, in a possible implementation, both the RT2 and the RT1 are labels of an EVRF. Alternatively, in a possible implementation, both the RT2 and the RT1 are labels of an EVRF, and the RT2 and the RT1 are the same.

The network identifier of the second VPN is mainly used to identify, on a forwarding plane, a VPN network in which the third network device is located. The network identifier of the second VPN may be a VPN segment identifier (SID), which may be referred to as a VPNSID2 for short, used by the third network device for an EVPN VPLS packet. The second network device and the third network device are mutual alias devices for the first network device. Therefore, the VPNSID2 and the VPNSID1 may be the same.

S402: The first network device obtains the address of the third network device.

After receiving the first packet, the first network device may find the alias device of the second network device by using one or more of an auto-discovery per Ethernet segment route mechanism and an auto-discovery per EVPN instance (EVI) route mechanism, where the alias device includes the third network device. The auto-discovery per Ethernet segment route mechanism may be briefly referred to as an AD per ES mechanism, and the auto-discovery per EVI route mechanism may be briefly referred to as an AD per EVI mechanism. The AD per EVI route may be a packet that is sent by the third network device to the first network device and that is described in S401. The packet includes information such as the address of the third network device, the RT2, and the network identifier of the second VPN.

In a specific embodiment, before receiving the first packet, the first network device first receives ES identifiers respectively sent by the second network device and the third network device. Because the second network device and the third network device belong to a same Ethernet segment, the ES identifiers sent to the first network device are the same, so that the first network device learns that the second network device and the third network device belong to the same Ethernet segment. Then, the second network device and the third network device send a route target RT to the first network device by using an auto-discovery (AD) per EVPN instance (EVI) aliasing route mechanism (which may be referred to as an AD per EVI aliasing route for short). It can be learned from the foregoing descriptions that the RT may be used to identify a VPN on the control plane. The RTs sent by the second network device and the third network device are the same, so that the first network device learns that the second network device and the third network device belong to a same VPN. In the same ES, network devices belonging to the same VPN are mutual alias devices. Therefore, the first network device may determine, based on the received ES and RT, that the second network device and the third network device are mutual alias devices.

After receiving the ES identifiers and the RTs that are sent by the second network device and the third network device, the first network device stores the ES identifiers and the RTs in a list, and stores the addresses of the second network device and the third network device in the list. An alias device of a network device can be found in the list. The list may further include information such as an address of the network device. The address of the network device may be a loopback address or an IP address of the network device.

In this case, after receiving the first packet, the first network device may find each alias device of the second network device in the list based on the ES in which the second network device is located and the RT1, where the alias device includes the third network device, and may obtain the address of the third network device from the list.

In another possible implementation, the first network device may not discover the alias devices of the second network device by using the auto-discovery mechanism, but may determine the alias devices of the second network device through pre-configuration, and may obtain addresses of the alias devices, to obtain the address of the third network device.

S403: The first network device determines the first forwarding policy based on the address of the third network device and the color identifier, and forwards, to the third network device according to the first forwarding policy, the traffic destined for the MAC address.

The first network device finds, by using the address of the third network device and the configured color identifier of the MAC address of the destination device as an index, the first forwarding policy established between the first network device and the third network device.

After finding the first forwarding policy established between the first network device and the third network device, the first network device may forward, to the third network device according to the first forwarding policy, the traffic destined for the destination device. In a possible implementation, after determining the first forwarding policy, the first network device finds a corresponding forwarding table based on the RT2, and then adds a forwarding entry to the forwarding table, to indicate the first network device to forward first traffic to the third network device according to the first forwarding policy, where the first traffic is the traffic destined for the MAC address of the destination device.

In addition, after receiving the first packet, the first network device finds, based on the address of the second network device and the configured color identifier of the MAC address of the destination device, the second forwarding policy established between the first network device and the second network device, then finds a corresponding forwarding table based on the RT1, and adds a forwarding entry to the forwarding table, to indicate the first network device to forward the first traffic to the second network device according to the second forwarding policy.

It is assumed that the RT1 and the RT2 are the same, the forwarding entries established for the second network device and the third network device are in one forwarding table. For example, refer to Table 1. Table 1 shows, based on FIG. 2 and FIG. 3, content of a part of the forwarding table obtained after the forwarding entries are established.

TABLE 1

| EVRF instance | MAC | Next-hop | Outbound interface |
|---|---|---|---|
| EVRF1 | MAC1 | PE112 | SR Policy2 |
| EVRF1 | MAC1 | PE113 | SR Policy2' |
| EVRF1 | Other-MAC | PE112 | SR Policy1 |
| EVRF1 | Other-MAC | PE113 | SR Policy1' |

In Table 1, it is assumed that the EVRF instance associated with the RT1 and the RT2 is EVRF1. After the forwarding entry is established in the first network device, that is, the PE111, traffic destined for the MAC1 may be forwarded according to the forwarding policy SR Policy2 and/or SR Policy2' that meet/meets the requirement of the specific service level agreement, regardless of whether a next hop is the PE112 or the PE113, while traffic destined for other MAC addresses can be forwarded according to the SR Policy1 and/or the SR Policy1'.

Embodiment 2

Figure 5:
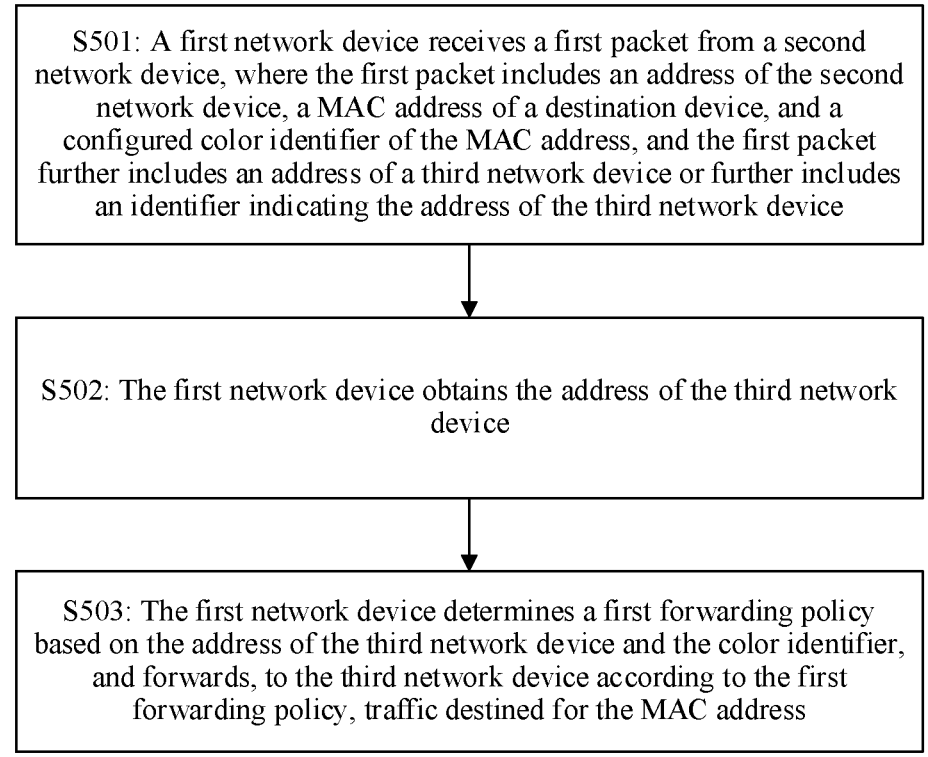
FIG. 5 is a schematic flowchart of another traffic forwarding processing method according to an embodiment of this application.

For a traffic processing method provided in this embodiment, refer to FIG. 5. The method may also be applied to the scenarios shown in FIG. 2 and FIG. 3, to resolve the problem that the specific service level agreement cannot be met. The method may include but is not limited to the following steps.

S501: A first network device receives a first packet from a second network device, where the first packet includes an address of the second network device, a MAC address of a destination device, and a configured color identifier of the MAC address, and the first packet further includes an address of a third network device or further includes an identifier indicating the address of the third network device.

The first packet in Embodiment 2 and the packet in Embodiment 1 are not a same packet.

The relationships between the first network device, the second network device, the third network device, and the destination device and the correspondence with FIG. 2 and FIG. 3 described in Embodiment 1 are also applied to Embodiment 2. Details are not described herein again.

In a specific embodiment, the second network device and the third network device establish a neighbor relationship, for example, establish a BGP neighbor relationship, an OSPF neighbor relationship, or an IS-IS neighbor relationship. Therefore, the second network device and the third network device may learn, based on the established neighbor relationship, that the second network device and the third network device belong to a same Ethernet segment and belong to a same EVPN instance, and may learn that the second network device and the third network device are mutual alias devices.

In this case, after completing configuration of the color identifier of the MAC address of the destination device, the second network device generates the first packet, and sends the first packet to the first network device. The first packet may include the address of the third network device or the identifier indicating the address of the third network device. For a process in which the second network device completes the configuration of the color identifier of the MAC address of the destination device, refer to corresponding descriptions in S401 in Embodiment 1. Details are not described herein again.

The first packet may further include the address of the second network device, an RT1, the MAC address of the destination device, the configured color identifier of the MAC address, a network identifier of a first VPN, and the like. For specific descriptions of information included in the first packet, refer to corresponding descriptions in S401 in Embodiment 1. Details are not described herein again.

It should be noted that, in an existing EVPN protocol, information that is used to advertise a route and that is sent by the second network device to the first network device does not include the address of the third network device or does not include the identifier. Therefore, the solution of Embodiment 2 may be implemented by modifying the EVPN protocol.

S502: The first network device obtains the address of the third network device.

If the first packet includes the address of the third network device, the first network device may directly parse the first packet to obtain the address of the third network device.

If the first packet includes the identifier indicating the address of the third network device, where for example, the identifier may be a label of an EVI to which the MAC address belongs, or may be any preset identifier, after receiving the first packet, the first network device may parse the first packet to obtain the identifier, and find the address of the third network device in a corresponding list based on the identifier.

S503: The first network device determines a first forwarding policy based on the address of the third network device and the color identifier, and forwards, to the third network device according to the first forwarding policy, traffic destined for the MAC address.

For specific descriptions of S503, refer to the specific descriptions of S403 in the foregoing Embodiment 1. Details are not described herein again.

In Embodiment 2, it is also implemented that in the first network device, the traffic destined for the MAC address of the destination device can be forwarded according to a forwarding policy that meets a specific service level agreement, regardless of whether a next hop is the second network device or the third network device, so that the traffic meets the requirement of the specific service level agreement.

Embodiment 3

Figure 6:
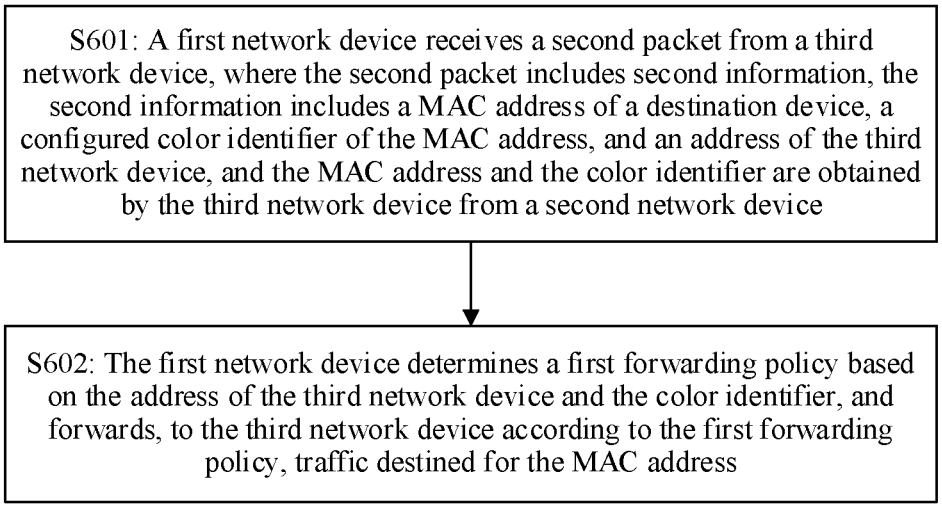
FIG. 6 is a schematic flowchart of another traffic forwarding processing method according to an embodiment of this application.

For a traffic processing method provided in this embodiment, refer to FIG. 6. The method may also be applied to the scenarios shown in FIG. 2 and FIG. 3, to resolve the problem that the specific service level agreement cannot be met. The method may include but is not limited to the following steps.

S601: A first network device receives a second packet from a third network device, where the second packet includes second information, and the second information includes a MAC address of a destination device, a configured color identifier of the MAC address, and an address of the third network device, and the MAC address and the color identifier are obtained by the third network device from a second network device.

The relationships between the first routing device, the second routing device, the third network device, and the destination device and the correspondence with FIG. 2 and FIG. 3 described in Embodiment 1 are also applied to Embodiment 3. Details are not described herein again.

In a specific embodiment, the second network device and the third network device establish a neighbor relationship, for example, establish a BGP neighbor relationship, an OSPF neighbor relationship, or an IS-IS neighbor relationship. Therefore, the second network device and the third network device may learn, based on the established neighbor relationship, that the second network device and the third network device belong to a same Ethernet segment and belong to a same EVPN instance, and may learn that the second network device and the third network device are mutual alias devices.

In this embodiment of this application, after completing the configuration of the color identifier of the MAC address of the destination device, the second network device may send the MAC address and the configured color identifier of the MAC address to an alias device of the second network device, where the alias device includes the third network device. For a process in which the second network device completes the configuration of the color identifier of the MAC address of the destination device, refer to corresponding descriptions in S401 in Embodiment 1. Details are not described herein again.

It should be noted that in an existing EVPN protocol, a function of sending the MAC address and the configured color identifier of the MAC address by the second network device to the alias device cannot be implemented. Therefore, Embodiment 3 may be implemented by adding an agreement of the function to the EVPN protocol.

In addition, if a function that a device can send a MAC address and a color identifier configured for the MAC address to an alias device is added to the EVPN protocol, a TLV in the EVPN protocol needs to be extended, where the TLV is used to encapsulate information into a packet format. The TLV is a structure including data type, data length, and data value, and can describe almost any data type. Therefore, a TLV structure may be extended to encapsulate the MAC address to be sent and the color identifier configured for the MAC address. That the MAC address and the color identifier are obtained by the third network device from the second network device includes: The MAC address and the color identifier are obtained by the third network device from a TLV field of a packet sent by the second network device.

In the EVPN protocol, an extension mechanism of a packet obtained by encapsulating the extended TLV structure may be further defined, that is, between which devices the packet may be sent and received may be further defined. For example, it is defined that the packet may be sent by a device to an alias device, and the alias device may receive the packet and perform subsequent processing.

The subsequent processing may be as follows: After receiving the MAC address of the destination device and the configured color identifier of the MAC address that are sent by the second network device, the third network device generates the second packet, and sends the second packet to the first network device. In addition to the second information, the second packet may further include an RT2, a network identifier of a second VPN, and the like. For specific descriptions of information included in the second packet, refer to corresponding descriptions in S401 in Embodiment 1. Details are not described herein again.

S602: The first network device determines a first forwarding policy based on the address of the third network device and the color identifier, and forwards, according to the first forwarding policy, traffic destined for the MAC address to the third network device.

For specific descriptions of S602, refer to the specific descriptions of S403 in Embodiment 1. Details are not described herein again.

In addition, after completing the configuration of the color identifier of the MAC address of the destination device, the second network device may also generate the first packet described in S401, where the first packet may be referred to as a third packet in Embodiment 3, and sends the third packet to the first network device. In this way, the network device may generate, based on the third packet, a forwarding entry indicating the first network device to forward first traffic to the second network device according to a second forwarding policy. For a specific process of generating the forwarding entry, refer to the corresponding descriptions in S403 in Embodiment 1. Details are not described herein again.

In Embodiment 3, it is also implemented that in the first network device, the traffic destined for the MAC address of the destination device can be forwarded according to a forwarding policy that meets a specific service level agreement, regardless of whether a next hop is the second network device or the third network device, so that the traffic meets the requirement of the specific service level agreement.

Based on Embodiment 3, in another possible embodiment, the extended TLV structure is not limited to encapsulating a MAC address and a color identifier configured for the MAC address, and may be further used to encapsulate a plurality of MAC addresses and color identifiers configured for the plurality of MAC addresses. In addition, the alias devices may send the MAC address and the color identifier configured for the MAC address to each other. In addition, carrying the MAC address and the color identifier configured for the MAC address in the TLV extension manner is used as a possible example. In an actual application, another proper manner may be selected as required for carrying.

For example, it is assumed that the destination device in Embodiment 3 is a first destination device, the system further includes a second destination device, and a switch sends a MAC address of the second destination device to the third network device. In this case, the third network device configures a color identifier for the MAC address of the second destination device, and then sends the MAC address and the configured color identifier to the second network device according to the extended EVPN protocol. In this case, the MAC address of the first destination device and the color identifier of the MAC address are included, and both the second network device and the third network device store MAC addresses and color identifiers of two destination devices (that is, the first destination device and the second destination device). Therefore, the second packet sent by the third network device to the first network device may further include the MAC address of the second destination device and the color identifier of the MAC address. The third packet sent by the second network device to the first network device may further include the MAC address of the second destination device and the color identifier of the MAC address.

Figure 7:
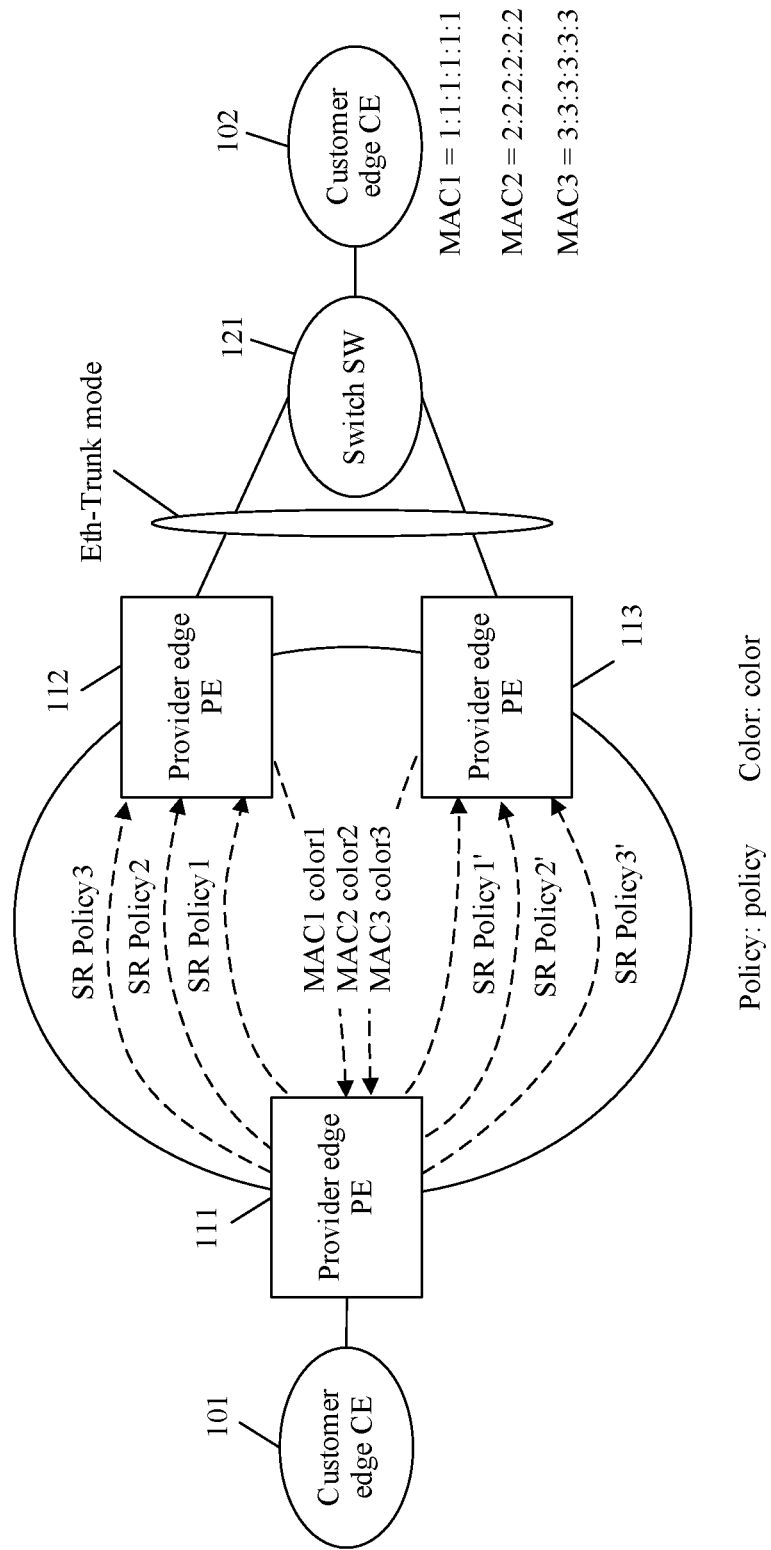
FIG. 7 is a schematic diagram of another system scenario to which a traffic forwarding processing method is applicable according to this application.

For ease of understanding, the following provides descriptions with reference to an example in FIG. 7. FIG. 7 is obtained by adding some information on the basis of FIG. 2 and FIG. 3. Therefore, the foregoing descriptions of FIG. 2 and FIG. 3 are applicable to FIG. 7.

As shown in FIG. 7, three MAC addresses of three destination devices (for example, user hosts) are attached on a CE102, which are MAC1, MAC2, and MAC3. MAC2=2:2:2:2:2:2, and MAC3=3:3:3:3:3:3. Devices corresponding to MAC1, MAC2, and MAC3 may be referred to as a first destination device, a second destination device, and a third destination device respectively. It is assumed that a switch SW121 sends MAC1 to a PE112, and sends MAC2 and MAC3 to a PE113. Then, the PE112 colors MAC1, to be specific, configures a color identifier for MAC1. It is assumed that the configured color identifier is represented by color1. The PE113 colors MAC2 and MAC3, that is, configures color identifiers for MAC2 and MAC3. It is assumed that the color identifier configured for MAC2 is represented by color2, and the color identifier configured for MAC3 is represented by color3. color3 is also a color identifier of an SR Policy3 and an SR Policy3'. To be specific, the PE111 may forward, according to the SR Policy3 and the SR Policy3', traffic destined for MAC3. Then, based on the manner of extending the EVPN protocol described in Embodiment 3, the PE112 may encapsulate MAC1 and color1 into a packet based on the extended TLV structure and send the packet to the alias device PE113, and the PE113 may encapsulate MAC2, color2, MAC3, and color3 into a packet based on the extended TLV structure and send the packet to the alias device PE112. Then, the PE112 and the PE113 separately send the obtained MAC1, color1, MAC2, color2, MAC3, and color3 to the PE111. After receiving the packet, the PE111 may establish a corresponding forwarding entry based on a same MAC and same color information that are separately received from the PE112 and the PE113. For a specific process of establishing the forwarding entry, refer to the foregoing descriptions. Details are not described herein again.

Based on Embodiment 3 and the possible embodiments thereof, in another possible embodiment, after the second network device and the third network device obtain, according to the extended EVPN protocol, the MAC address and the color identifier of the MAC address sent by each other, only one of the network devices, for example, the second network device or the third network device, may send a plurality of MAC addresses colored by the two devices and color identifiers corresponding to the MAC addresses to the first network device based on a preset configuration, not all alias devices send the MAC addresses and the color identifiers. An example in which the third network device is preset to perform sending is used below for further description.

In a possible implementation, when sending the plurality of MAC addresses and the color identifiers corresponding to the MAC addresses to the first network device, the third network device may send an address of an alias device (including the second network device) to the first network device together, so that the first device determines, based on the address of the alias device, a forwarding policy corresponding to the alias device, to establish a forwarding entry. For a specific process of determining the forwarding policy and establishing the forwarding entry, refer to the specific descriptions of S402 and S403 in Embodiment 1. Details are not described herein again.

In another possible implementation, when sending the plurality of MAC addresses and the color identifiers corresponding to the MAC addresses to the first network device, the third network device may send, to the first network device, an identifier indicating an address of an alias device (including the second network device), so that the first device determines a corresponding forwarding policy based on the identifier, to establish a forwarding entry. For a specific process of determining the forwarding policy and establishing the forwarding entry, refer to the corresponding descriptions in Embodiment 2. Details are not described herein again.

In another possible implementation, when the third network device sends the plurality of MAC addresses and the color identifiers corresponding to the MAC addresses to the first network device, an address of an alias device or an identifier indicating the address of the alias device may not be carried. Instead, the first network device finds the address of the alias device based on the MAC address and an AD per ES mechanism and/or an AD per EVI route mechanism, to determine corresponding forwarding policies based on the addresses, to establish a forwarding entry. For a process of searching for the address of the alias device, determining the forwarding policy, and establishing the forwarding entry, refer to the specific descriptions in Embodiment 1. Details are not described herein again.

In a possible embodiment, based on the forwarding entries established in the foregoing embodiments, the first network device may forward, to the third network device according to the first forwarding policy, a first part of the traffic destined for the MAC address, and the first network device may forward, to the second network device according to the second forwarding policy, a second part of the traffic destined for the MAC address. When the alias device of the second network device is only the third network device, the first part and the second part of the traffic may be all service traffic destined for the MAC address. When the alias devices of the second network device include another network device in addition to the third network device, the first part and the second part of the traffic may be a part or all of service traffic destined for the MAC address. If the first part and the second part of the traffic are a part of service traffic, remaining service traffic may be forwarded by using the another network device. For a manner in which the first network device determines a forwarding policy for the another network device, refer to the foregoing embodiments.

The foregoing mainly describes the traffic forwarding processing method provided in embodiments of this application. It may be understood that, to implement the foregoing functions, each device includes corresponding hardware structures and/or software modules for performing corresponding functions. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. The persons skilled in the art may use different methods to implement the described functions for each particular application, but it should not be considered that the implementation goes beyond the scope of this application.

In embodiments of this application, the device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in embodiments of this application, division into modules is an example, and is merely a logical function division. In an actual implementation, another division manner may be used.

Figure 8:
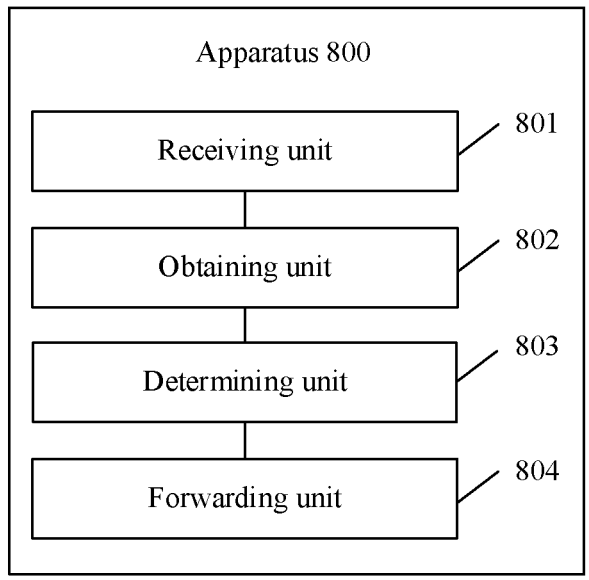
FIG. 8 is a schematic diagram of a logical structure of a device according to an embodiment of this application.

When each functional module is obtained through division based on each corresponding function, FIG. 8 shows a possible schematic diagram of a logical structure of an apparatus. The apparatus may be the first network device in the foregoing embodiments, or may be a chip in the first network device, or may be a processing system in the first network device, or the like. The apparatus 800 includes a receiving unit 801, an obtaining unit 802, a determining unit 803, and a forwarding unit 804.

The receiving unit 801 is configured to receive a first packet from a second network device, where the first packet includes a media access control (MAC) address of a destination device and a color identifier of the MAC address.

The obtaining unit 802 is configured to obtain an address of a third network device, where the destination device is multi-homed to the second network device and the third network device.

The determining unit 803 is configured to determine a first forwarding policy based on the address of the third network device and the color identifier.

The forwarding unit 804 is configured to forward, to the third network device according to the first forwarding policy, traffic destined for the MAC address.

In a possible implementation, the obtaining unit 802 is specifically configured to:
determine to constitute one or more network devices of a multi-homing device of the destination device together with the second network device, where the one or more network devices include the third network device; and
obtain an address of the one or more network devices.

In a possible implementation, that the obtaining unit 802 determines to constitute one or more network devices of a multi-homing device of the destination device together with the second network device is specifically:
finding an address of one or more alias devices of the second network device based on an auto-discovery mechanism, where the one or more alias devices include the third network device, and the auto-discovery mechanism includes one or more of an auto-discovery per Ethernet segment route AD per ES mechanism and an auto-discovery per Ethernet virtual private network instance route AD per EVI mechanism.

In a possible implementation, the first packet further includes an identifier corresponding to the address of the third network device, and the obtaining unit 802 is specifically configured to:
when the identifier includes the address of the third network device, parse the identifier to obtain the address of the third network device; or
when the identifier is an identifier indicating the address of the third network device, find the address of the third network device based on the identifier.

In a possible implementation, the MAC address and the color identifier in the first packet received by the receiving unit 801 from the second network device are from the third network device.

In a possible implementation, the forwarding unit 804 is specifically configured to: establish a forwarding entry based on the MAC address, the address of the third network device, and the first forwarding policy, where the forwarding entry indicates to forward the traffic according to the first forwarding policy; and
forward the traffic to the third network device based on the forwarding entry.

In a possible implementation, the first packet further includes a route target and a virtual private network identifier.

In a possible implementation, the traffic forwarded to the third network device according to the first forwarding policy and destined for the MAC address is a first part of the traffic destined for the MAC address, and the first packet further includes an address of the second network device.

The determining unit 803 is further configured to determine, by the first network device, a second forwarding policy based on the address of the second network device and the color identifier.

The forwarding unit 804 is further configured to forward, to the second network device according to the second forwarding policy, a second part of the traffic destined for the MAC address.

For specific operations of the units in the apparatus 800 shown in FIG. 8 and beneficial effects, refer to the descriptions in the method and the possible implementations of the method in FIG. 4 or FIG. 5. Details are not described herein again.

Figure 9:
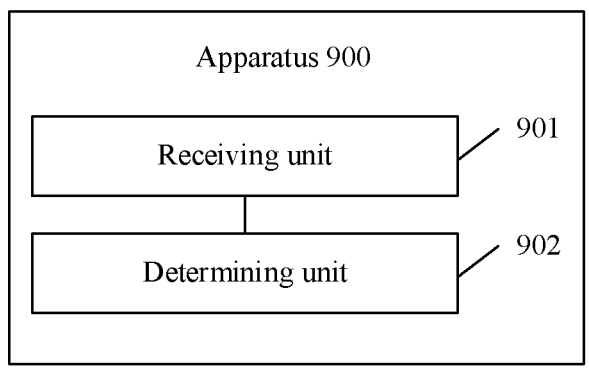
FIG. 9 is a schematic diagram of a logical structure of another device according to an embodiment of this application.

When each functional module is obtained through division based on each corresponding function, FIG. 9 shows a possible schematic diagram of a logical structure of an apparatus. The apparatus may be the first network device in Embodiment 3, or may be a chip in the first network device, or may be a processing system in the first network device, or the like. The apparatus 900 includes a receiving unit 901 and a determining unit 902.

The receiving unit 901 is configured to receive a second packet from a third network device, where the second packet includes a first media access control (MAC) address of a first destination device, a first color identifier of the first MAC address, and an address of the third network device, and the first MAC address and the first color identifier in the second packet sent by the third network device are obtained by the third network device from a second network device.

The determining unit 902 is configured to determine a first forwarding policy based on the address of the third network device and the first color identifier, and forward, to the third network device according to the first forwarding policy, traffic destined for the first MAC address.

In a possible implementation, that the first MAC address and the first color identifier are obtained by the third network device from the second network device includes:
The first MAC address and the first color identifier are obtained by the third network device from a type-length-value (TLV) field of a packet sent by the second network device.

In a possible implementation, the receiving unit 901 is further configured to receive a third packet from the second network device, where the third packet includes the first MAC address and the first color identifier.

The determining unit 902 is further configured to determine a second forwarding policy based on the first MAC address and the first color identifier in the third packet, and forward, to the second network device according to the second forwarding policy, traffic destined for the first MAC address.

In a possible implementation, a first system further includes a second destination device. The second packet and the third packet each further include a second MAC address of the second destination device and a second color identifier of the second MAC address, and the second MAC address and the second color identifier are from the third network device.

In a possible implementation, the second packet further includes a route target and a virtual private network identifier.

The first MAC address is a MAC address of one of devices connected to the destination device in FIG. 6 and the possible implementations in FIG. 6, and the second MAC address is a MAC address of another device of the devices connected to the destination device.

For specific operations of the units in the apparatus 900 shown in FIG. 9 and beneficial effects, refer to the descriptions in the method and the possible implementations of the method in FIG. 6. Details are not described herein again.

Figure 10:
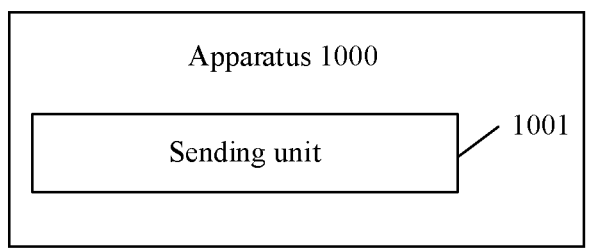
FIG. 10 is a schematic diagram of a logical structure of another device according to an embodiment of this application.

When each functional module is obtained through division based on each corresponding function, FIG. 10 shows a possible schematic diagram of a logical structure of an apparatus. The apparatus may be the second network device in Embodiment 2, or may be a chip in the second network device, or may be a processing system in the second network device, or the like. The apparatus 1000 includes a sending unit 1001.

The sending unit 1001 is configured to send a first packet to a first network device. The first packet includes a media access control (MAC) address of a destination device and a color identifier of the MAC address, and the first packet further includes an address of a third network device or further includes an identifier indicating the address of the third network device. The first packet instructs the first network device to determine a first forwarding policy, and the first forwarding policy is used to forward, to the third network device, traffic destined for the MAC address.

For specific operations of the units in the apparatus 1000 shown in FIG. 10 and beneficial effects, refer to the descriptions in the method and the possible implementations of the method in FIG. 5. Details are not described herein again.

Figure 11:
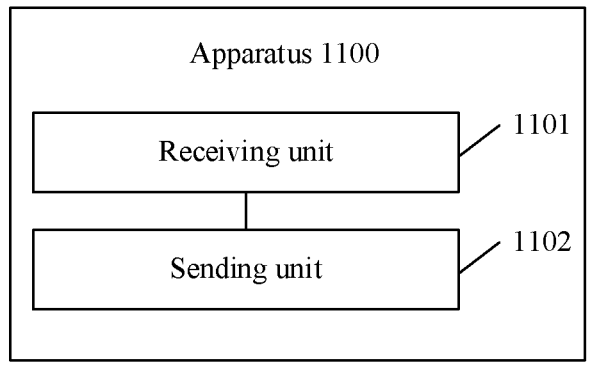
FIG. 11 is a schematic diagram of a logical structure of another device according to an embodiment of this application.

When each functional module is obtained through division based on each corresponding function, FIG. 11 shows a possible schematic diagram of a logical structure of an apparatus. The apparatus may be the third network device in Embodiment 3, or may be a chip in the third network device, or may be a processing system in the third network device, or the like. The apparatus 1100 includes a receiving unit 1101 and a sending unit 1102.

The receiving unit 1101 is configured to receive a fourth packet from a second network device, where the fourth packet includes a first media access control (MAC) address of a first destination device and a first color identifier of the first MAC address.

The sending unit 1102 is configured to send a second packet to a first network device, where the second packet includes the first MAC address and the first color identifier, the second packet instructs the first network device to determine a first forwarding policy, and the first forwarding policy is used to forward, to the third network device, traffic destined for the MAC address.

The fourth packet may be a packet that is obtained by the third network device from the second network device and that includes the MAC address of the destination device and the color identifier of the MAC address in Embodiment 3 and the possible implementations of Embodiment 3.

In a possible implementation, the first MAC address and the first color identifier are carried in a type-length-value (TLV) field in the fourth packet.

In a possible implementation, a first system further includes a second destination device.

The sending unit 1102 is further configured to send a second MAC address of the second destination device and a second color identifier of the second MAC address to the second network device.

That the sending unit 1102 sends the second packet to the first network device is specifically as follows.

The sending unit 1102 sends the second packet including the first MAC address, the first color identifier, the second MAC address, and the second color identifier to the first network device.

For specific operations of the units in the apparatus 1100 shown in FIG. 11 and beneficial effects, refer to the descriptions in the method and the possible implementations of the method in FIG. 6. Details are not described herein again.

Figure 12:
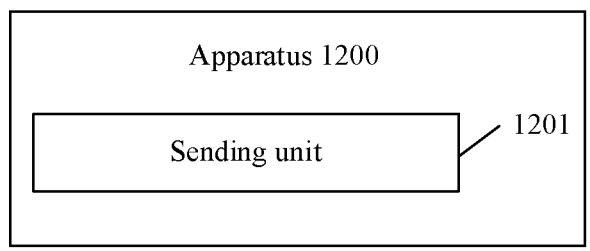
FIG. 12 is a schematic diagram of a logical structure of another device according to an embodiment of this application.

When each functional module is obtained through division based on each corresponding function, FIG. 12 shows a possible schematic diagram of a logical structure of an apparatus. The apparatus may be the second network device in Embodiment 3, or may be a chip in the second network device, or may be a processing system in the second network device, or the like. The apparatus 1200 includes a sending unit 1201.

The sending unit 1201 is configured to send a fourth packet to a third network device, where the fourth packet includes a first media access control (MAC) address of a first destination device and a first color identifier of the first MAC address, the first MAC address and the first color identifier instruct the third network device to send a second packet to a first network device, and the second packet includes the first MAC address and the first color identifier.

In a possible implementation, a first system further includes a second destination device. The traffic forwarding processing apparatus further includes:

a receiving unit, configured to receive a second MAC address of the second destination device and a second color identifier of the second MAC address from the third network device; and the sending unit 1201 is further configured to send a third packet to the first network device, where the third packet includes the first MAC address, the first color identifier, the second MAC address, and the second color identifier.

In a possible implementation, the first MAC address and the first color identifier are carried in a type-length-value (TLV) field in the fourth packet.

For specific operations of the units in the apparatus 1200 shown in FIG. 12 and beneficial effects, refer to the descriptions in the method and the possible implementations of the method in FIG. 6. Details are not described herein again.

Figure 13:
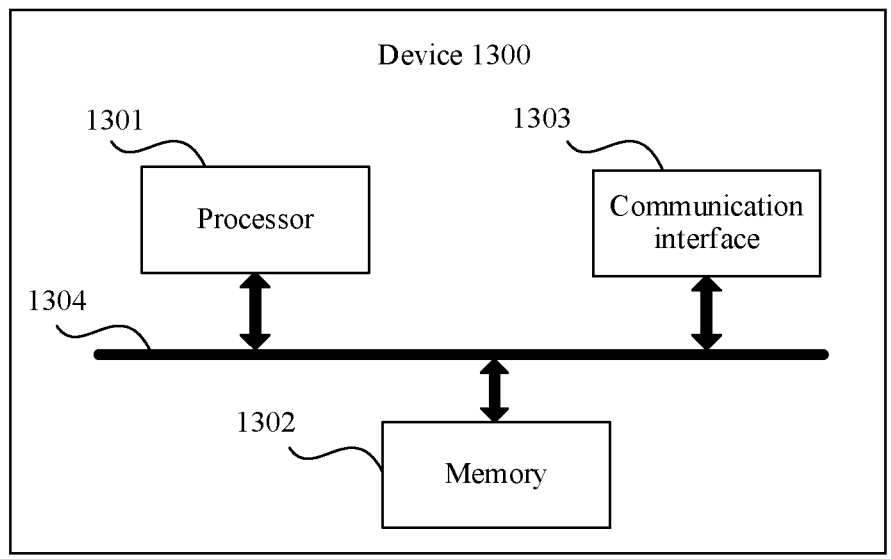
FIG. 13 is a schematic diagram of a hardware structure of a device according to an embodiment of this application.

FIG. 13 is a schematic diagram of a possible hardware structure of a device according to this application. The device may be any network device in the method in the foregoing embodiments, for example, may be the first network device, the second network device, or the third network device. The device 1300 includes a processor 1301, a memory 1302, and a communication interface 1303. The processor 1301, the communication interface 1303, and the memory 1302 may be connected to each other, or may be connected to each other through a bus 1304.

For example, the memory 1302 is configured to store a computer program and data of the device 1300. The memory 1302 may include but is not limited to a random access memory (RAM), a read-only memory (ROM), an erasable programmable read-only memory (EPROM), a portable read-only memory (CD-ROM), and the like.

When the embodiment shown in FIG. 8 is implemented, software or program code required for performing functions of all or some units in FIG. 8 is stored in the memory 1302.

When the embodiment shown in FIG. 9 is implemented, software or program code required for performing functions of all or some units in FIG. 9 is stored in the memory 1302.

When the embodiment shown in FIG. 10 is implemented, software or program code required for performing functions of all or some units in FIG. 10 is stored in the memory 1302.

When the embodiment shown in FIG. 11 is implemented, software or program code required for performing functions of all or some units in FIG. 11 is stored in the memory 1302.

When the embodiment shown in FIG. 12 is implemented, software or program code required for performing functions of all or some units in FIG. 12 is stored in the memory 1302.

When any one of the embodiments in FIG. 8 to FIG. 12 is implemented, if software or program code required by functions of some units is stored in the memory 1302, in addition to invoking the program code in the memory 1302 to implement some functions, the processor 1301 may further cooperate with another component (for example, the communication interface 1303) to complete another function (for example, a function of receiving data) described in any one of the embodiments in FIG. 8 to FIG. 12.

The communication interface 1303 is configured to support the device 1300 in performing communication, for example, receiving or sending data or a signal.

For example, the processor 1301 may be a central processing unit, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor. The processor 1301 may be configured to read a program stored in the memory 1302, and perform operations performed by the server in the method and the method in the possible implementations in FIG. 13.

For specific operations performed by the device 1300 shown in FIG. 13 and beneficial effects, refer to the descriptions in the foregoing method embodiments and the possible implementations of the method embodiments. Details are not described herein again.

An embodiment of this application further provides an apparatus. The apparatus includes a processor, a communication interface, and a memory. The apparatus is configured to perform the method in any one of the foregoing embodiments and the possible embodiments of the foregoing embodiments.

In a possible implementation, the apparatus is a chip or a system on a chip (SoC).

An embodiment of this application further provides a computer-readable storage medium. The computer-readable storage medium stores a computer program. The computer program is executed by a processor to implement the method in any one of the foregoing embodiments and the possible embodiments of the foregoing embodiments.

An embodiment of this application further provides a computer program product. When the computer program product is read and executed by a computer, the method in any one of the foregoing embodiments and the possible embodiments of the foregoing embodiments is performed.

An embodiment of this application further provides a computer program. When the computer program is executed on a computer, the computer is enabled to implement the method in any one of the foregoing embodiments and the possible embodiments of the foregoing embodiments.

In conclusion, this application can be used to match a forwarding policy that meets a requirement in a scenario in which a network device establishes a communication connection to an active-active or multi-active network device, to improve traffic forwarding efficiency.

In this application, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited. It should also be understood that although terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method, comprising:
 receiving, by a first network device, a first packet from a second network device, wherein the first packet comprises a media access control (MAC) address of a destination device and a color identifier of the MAC address;

obtaining, by the first network device, a third address of a third network device, wherein the third network device and the second network device are multi-homing devices of the destination device;determining, by the first network device, a first forwarding policy based on the third address of the third network device and the color identifier; and forwarding, by the first network device to the third network device according to the first forwarding policy, traffic destined for the MAC address of the destination device.

2. The method according to claim 1, wherein the obtaining, by the first network device, the third address of the third network device comprises:

determining, by the first network device, that the first network device together with the second network device constitute one or more network devices of the multi-homing devices of the destination device, wherein the one or more network devices comprise the third network device; and obtaining, by the first network device, an address of the one or more network devices.

3. The method according to claim 2, wherein the determining, by the first network device, that the first network device together with the second network device constitute the one or more network devices of the multi-homing devices of the destination device comprises:

finding, by the first network device, an alias address of one or more alias devices of the second network device based on an auto-discovery mechanism, wherein the one or more alias devices comprise the third network device, and the auto-discovery mechanism comprises one or more of an auto-discovery per Ethernet segment (AD per ES) route mechanism or an auto-discovery per Ethernet virtual private network instance (AD per EVI) route mechanism.

4. The method according to claim 1, wherein the first packet further comprises an identifier corresponding to the third address of the third network device, and the obtaining, by the first network device, the third address of the third network device comprises:

based on the identifier comprising the third address of the third network device, parsing, by the first network device, the identifier to obtain the third address of the third network device; or based on the identifier indicating the third address of the third network device, finding, by the first network device, the third address of the third network device based on the identifier.

5. The method according to claim 4, wherein the MAC address and the color identifier in the first packet received by the first network device from the second network device are from the third network device.

6. The method according to claim 1, wherein the forwarding, to the third network device according to the first forwarding policy, the traffic destined for the MAC address comprises:

establishing, by the first network device, a forwarding entry based on the MAC address, the third address of the third network device, and the first forwarding policy, wherein the forwarding entry indicates to forward the traffic according to the first forwarding policy; and forwarding, by the first network device, the traffic to the third network device based on the forwarding entry.

7. The method according to claim 1, wherein the first packet further comprises a route target and a virtual private network identifier.

8. The method according to claim 1, wherein the traffic destined for the MAC address and forwarded to the third network device according to the first forwarding policy includes a first part of the traffic destined for the MAC address, wherein the first packet further comprises a second address of the second network device, and wherein the method further comprises:

determining, by the first network device, a second forwarding policy based on the second address of the second network device and the color identifier; and forwarding, by the first network device to the second network device according to the second forwarding policy, a second part of the traffic destined for the MAC address.

9. A first network device, comprising:

a memory configured to store program instructions; and at least one processor, when the program instructions executed by the at least one processor, cause the first network device to perform operations including:

receiving a first packet from a second network device, wherein the first packet comprises a media access control (MAC) address of a destination device and a color identifier of the MAC address;

obtaining a third address of a third network device, wherein the third network device and the second network device are multi-homing devices of the destination device;

determining a first forwarding policy based on the third address of the third network device and the color identifier; and forwarding, to the third network device according to the first forwarding policy, traffic destined for the MAC address of the destination device.

10. The first network device according to claim 9, wherein the obtaining the third address of the third network device comprises:

determining that the first network device together with the second network device constitute one or more network devices of the multi-homing devices of the destination device, wherein the one or more network devices comprise the third network device; and obtaining an address of the one or more network devices.

11. The first network device according to claim 10, wherein the determining that the first network device together with the second network device constitute the one or more network devices of the multi-homing devices of the destination device comprises:

finding an alias address of one or more alias devices of the second network device based on an auto-discovery mechanism, wherein the one or more alias devices comprise the third network device, and the auto-discovery mechanism comprises one or more of an auto-discovery per Ethernet segment (AD per ES) route mechanism or an auto-discovery per Ethernet virtual private network instance (AD per EVI) route mechanism.

12. The first network device according to claim 9, wherein the first packet further comprises an identifier corresponding to the third address of the third network device, and the obtaining the third address of the third network device comprises:

based on the identifier comprising the third address of the third network device, parsing the identifier to obtain the third address of the third network device; or based on the identifier indicating the third address of the third network device, finding the third address of the third network device based on the identifier.

13. The first network device according to claim 12, wherein the MAC address and the color identifier in the first packet received by the first network device from the second network device are from the third network device.

14. The first network device according to claim 9, wherein the forwarding, to the third network device according to the first forwarding policy, the traffic destined for the MAC address comprises:

establishing a forwarding entry based on the MAC address, the third address of the third network device, and the first forwarding policy, wherein the forwarding entry indicates to forward the traffic according to the first forwarding policy; and forwarding the traffic to the third network device based on the forwarding entry.

15. The first network device according to claim 9, wherein the first packet further comprises a route target and a virtual private network identifier.

16. The first network device according to claim 9, wherein the traffic destined for the MAC address and forwarded to the third network device according to the first forwarding policy includes a first part of the traffic destined for the MAC address, wherein the first packet further comprises a second address of the second network device, and wherein the operations further comprise:

determining a second forwarding policy based on the second address of the second network device and the color identifier; and forward, to the second network device according to the second forwarding policy, a second part of the traffic destined for the MAC address.

17. A second network device, wherein comprises:

a memory configured to store program instructions; and at least one processor, when the program instructions executed by the at least one processor, cause the second network device to perform operations including:

sending a first packet to a first network device, wherein the first packet comprises a media access control (MAC) address of a destination device and a color identifier of the MAC address, the first packet further comprises a third address of a third network device or further comprises an identifier indicating the third address of the third network device, the first packet instructs the first network device to determine a first forwarding policy, and the first forwarding policy causes the first network device to forward, to the third network device, traffic destined for the MAC address of the destination device, wherein the destination device is multi-homed to the second network device and the third network device.

18. The second network device according to claim 17, wherein the MAC address and the color identifier in the first packet are from the third network device.

19. The second network device according to claim 17, wherein the first packet further comprises a route target and a virtual private network identifier.

20. The second network device according to claim 17, wherein the first network device together with the second network device constitute one or more network devices of multi-homing devices of the destination device, and wherein the one or more network devices comprise the third network device.

* * * * *